Figure 3:
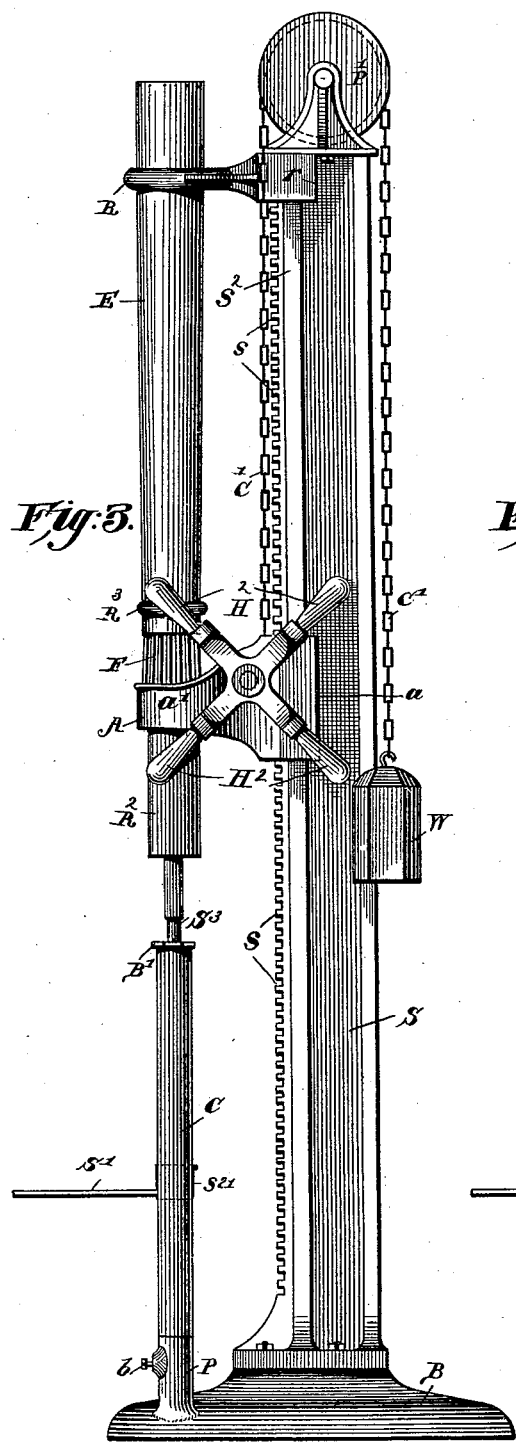

(No Model.) 4 Sheets—Sheet 1.
J. T. CARTWRIGHT & R. WALLWORK.
APPARATUS FOR APPLYING SKINS, &c., TO INKING ROLLERS.
No. 464,093. Patented Dec. 1, 1891.
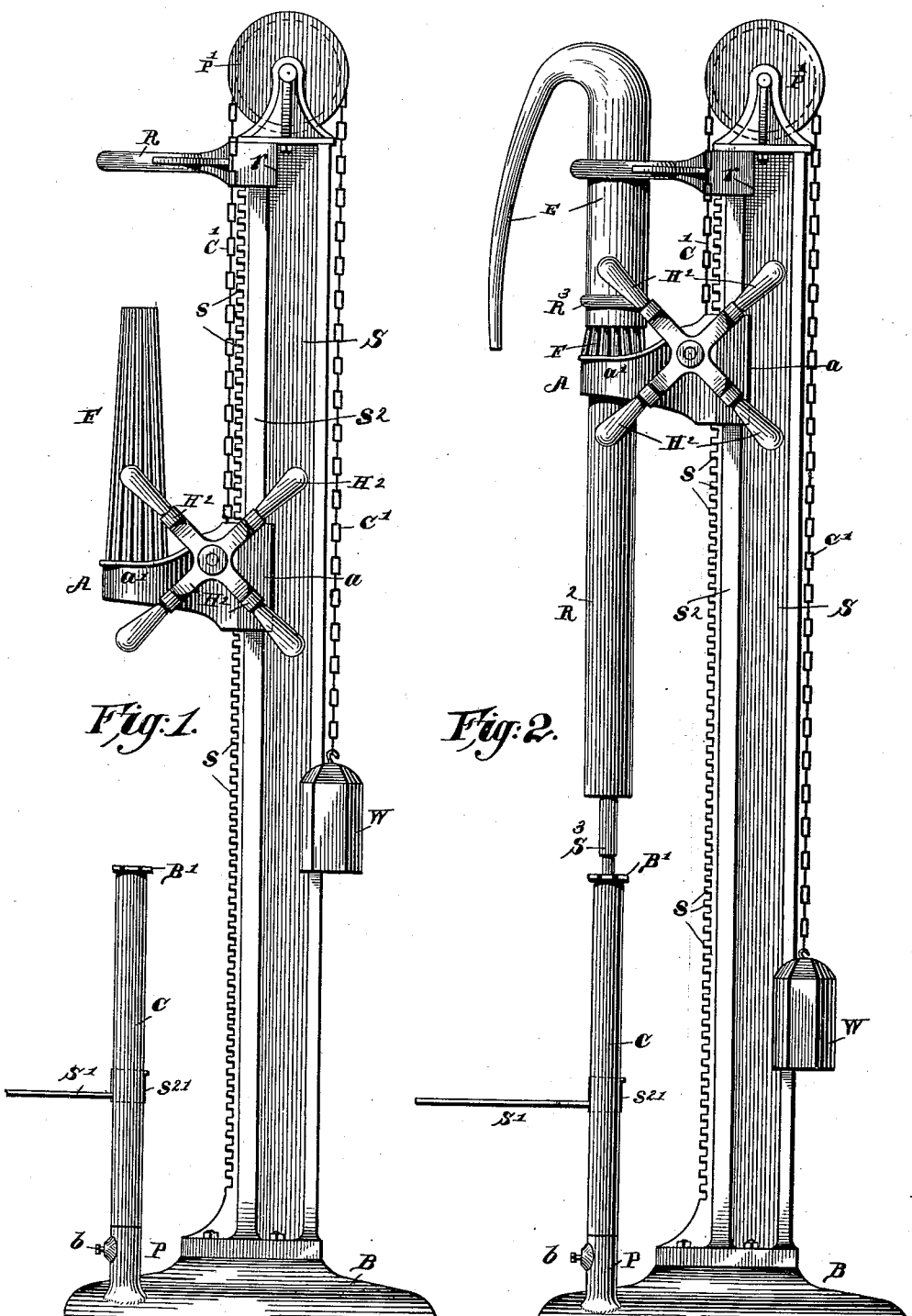

(No Model.) 4 Sheets—Sheet 2.

J. T. CARTWRIGHT & R. WALLWORK.
APPARATUS FOR APPLYING SKINS, &c., TO INKING ROLLERS.

No. 464,093. Patented Dec. 1, 1891.

Witnesses:
H. E. Dieterich
D. W. Sommers

Inventors:
John T. Cartwright, and
Roughsedge Wallwork.
by Henry Orth
Atty.

(No Model.) 4 Sheets—Sheet 3.
J. T. CARTWRIGHT & R. WALLWORK.
APPARATUS FOR APPLYING SKINS, &c., TO INKING ROLLERS.
No. 464,093. Patented Dec. 1, 1891.
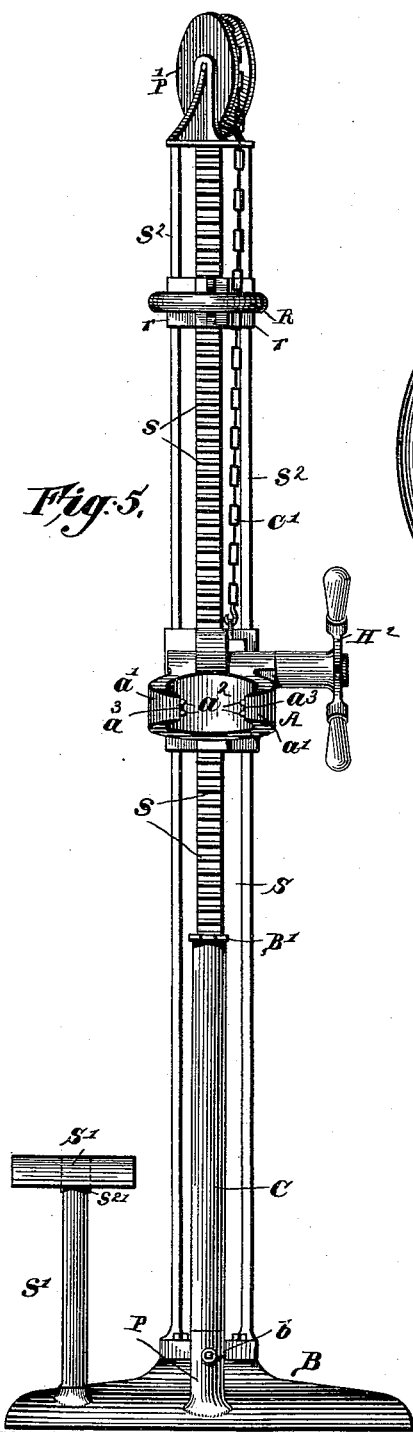
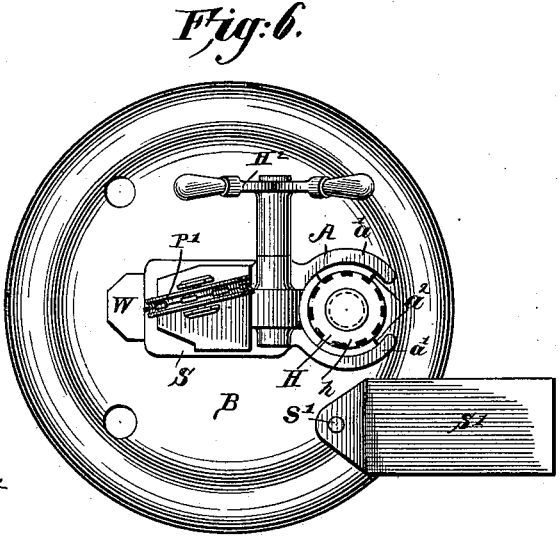
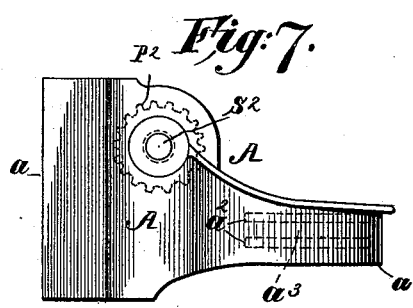
Witnesses:
H. F. Dieterich
P. W. Sommers
Inventors:
John T. Cartwright, and
Roughsedge Wallwork.
By Henry M. Atty:

(No Model.) 4 Sheets—Sheet 4.
J. T. CARTWRIGHT & R. WALLWORK.
APPARATUS FOR APPLYING SKINS, &c., TO INKING ROLLERS.
No. 464,093. Patented Dec. 1, 1891.
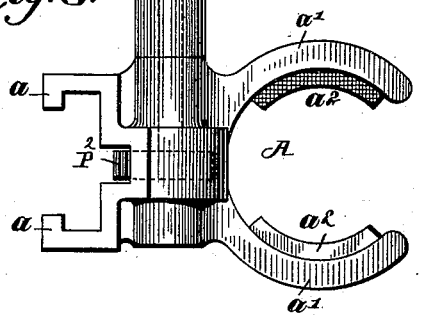
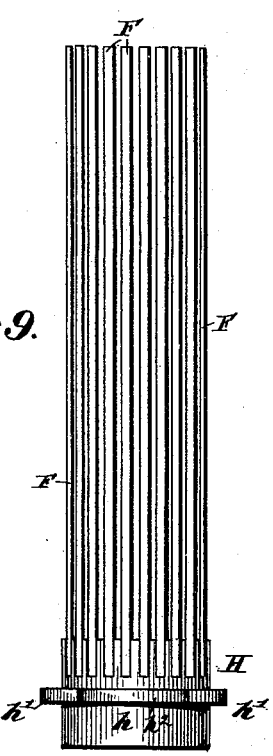
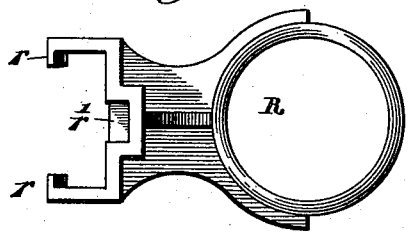
Witnesses:
H. G. Dieterich
C. W. Sommers
Inventor:
John T. Cartwright and
Roughsedge Wallwork
by Henry Orth
Atty.

UNITED STATES PATENT OFFICE.

JOHN TURNER CARTWRIGHT, OF HYDE, AND ROUGHSEDGE WALLWORK, OF MANCHESTER, ENGLAND.

APPARATUS FOR APPLYING SKINS, &c., TO INKING-ROLLERS.

SPECIFICATION forming part of Letters Patent No. 464,093, dated December 1, 1891.

Application filed July 31, 1891. Serial No. 401,243. (No model.) Patented in England November 21, 1889, No. 18,647; in France June 2, 1890, No. 206,072, and in Germany June 9, 1890, No. 55,913.

*To all whom it may concern:*

Be it known that we, JOHN TURNER CARTWRIGHT, residing at Hyde, in the county of Chester, and ROUGHSEDGE WALLWORK, residing at Manchester, in the county of Lancaster, England, have invented certain new and useful Improvements in Apparatus for Applying Skins or other Suitable Coverings to Inking and Distributing Rollers Used in Lithographic Printing, (for which we have obtained patents in England November 21, 1889, No. 18,647; in France June 2, 1890, No. 206,072, and in Germany June 9, 1890, No. 55,913;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to the art of clothing or covering or applying the skin or other suitable covering to inking and distributing rollers used in lithographic and other printing.

Before our invention the skin or other covering has been applied by hand to the inking and distributing rolls used in printing, and more especially in lithographic printing, requiring the services of one or more workmen for from one quarter of an hour to four hours, according to the nature of the packing of the roll and its size, while the reduction in diameter of the skin or covering, or the stretching of a "bagged" skin or covering cannot be done by hand.

The object of this invention is to provide means whereby such a skin or covering may be mechanically applied to inking and distributing rollers by a single operator and in a comparatively short time, practical experience having demonstrated that this operation can be performed with our machine, and after a little experience in about five minutes.

To these ends the invention consists in structural features and combinations of parts as will now be fully described, reference being had to the accompanying drawings, in which similar letters of reference indicate like parts wherever such may occur, and in which drawings—

Figures 1, 2, 3, and 4 are side elevations of our machine, illustrating the operation of covering a roller, the operative parts in Fig. 1 being in their relative positions for the reception of the roller and covering. Fig. 5 is a front elevation of the machine. Fig. 6 is a top plan view thereof, and Fig. 7 is a side elevation of the carrier or carriage for the holder used in drawing the skin or cover onto the roller. Fig. 8 is a top plan view of said carriage. Fig. 9 is an elevation, and Fig. 10 a plan view, of the holder for the skin or covering; and Fig. 11 is a top plan view of a guide-ring for guiding the skin or covering onto the roller.

The machine consists of a standard S, rising from a suitable base or bed-plate B, to which is secured the foot $s'$ of a table or step S'. From the base B also rises a short post P, that has a tubular bearing for the reception of the journal at one end of a cylinder C, which journal is secured in the bearing of the post by means of a set-screw $b$. The upper end of the cylinder C receives a bushing B' for one end of the spindle $S^3$ or for one of the journals of the roller $R^2$ to be covered, said cylinder being parallel with and immediately in front of a toothed rack $s$, formed on or secured to the standard S, which latter has on opposite sides of the rack a guide-rib $s^2$, that serves to guide the guide-ring R and the carriage A of the holder H for the skin or covering E in their movements along the rack-bar $s$. The standard S is further provided at its upper end with a sheave or pulley P' for a chain C', one end of said chain being attached to the carriage A and the other to a counterbalancing-weight W, that counterbalances the weight of the carriage A and holds the same at any point along the standard to which it may be moved. The connection between the chain and carrier A should be such that the latter will be held at right angles to the standard S, so as not to bind on the ribs $s^2$ in its movements along the standard.

The carriage A, Figs. 8 and 9, has two arms $a\,a$, that encompass the ribs $s^2$ on standard S, and two curved arms $a'\,a'$, from the inner face of which projects a rib $a^2\,a^2$, that has a central groove $a^3$, (shown in dotted lines in Fig. 7,) the inner face of said curved arms $a'$ forming the greater part of a circle, the like face of the ribs $a^2$ being segments of a smaller circle.

In the carriage A are formed bearings for shaft $S^2$, that carries a pinion $P^2$, also shown in dotted lines in Fig. 7 and partly in full lines in Fig. 8, said pinion being in gear with the toothed rack $s$ on standard S.

Figure 4:
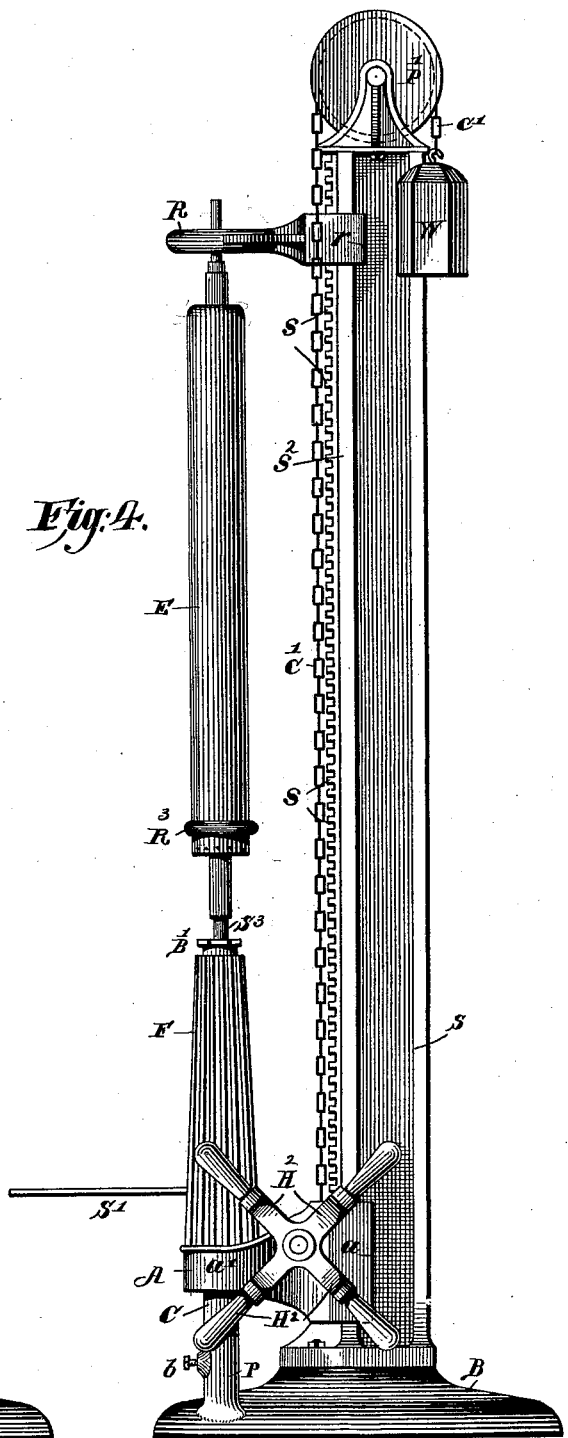

The guide-ring R, Fig. 11, that serves to guide the skin or covering E, Figs. 2, 3, and 4, for the rollers has arms $r\,r$, that encompass the guide-ribs $s^2$ on standard S, and a single tooth $r'$, adapted to engage the teeth of the rack $s$, said ring being so arranged on the standard that by tilting the same upwardly its tooth $r'$ will move out of engagement with the toothed rack $s$, for the purpose of moving said ring to any desired position above the carrier A.

The means for holding the skin or covering E and drawing the same onto a roller consist of a holder H, Figs. 9 and 10, composed of metallic elastic fingers or blades F, secured at their lower end in suitable recesses formed in a sleeve or thimble $h$, that has a mutilated circular flange $h'$, a portion of which is cut away on opposite sides, (see Fig. 10,) so that when said holder is placed in the carriage A with the mutilated portions $h^2\,h^2$ of the flange $h'$ in register with the ribs $a^2$ on the arms $a'$ of said carriage the holder may be pushed into the carriage far enough to bring the flanges $h'$ into the plane of the groove $a^3$ in said ribs $a^2$, and by giving the holder a half-turn, the said flange will enter the grooves and lock the holder to the carriage.

The operation of the machine is as follows, reference being had to Figs. 1 to 4, inclusive: The guide-ring R is moved to the upper end of the standard S, or as far toward said upper end, as is necessary. The holder H is then locked to its carriage A, as above described, and said holder is also moved up toward the upper end of the standard S by revolving the shaft $S^2$, that carries the pinion P in the proper direction by means of the four-armed handle $H^2$, the operator standing on the table or step $S'$. The roller $R^2$ to be covered is now inserted into the holder H, one end of the roller-spindle or one of the journals being stepped into the bushing $B'$ in the upper end of cylinder C. The skin or other covering E, one end of which has previously been laced in the usual manner, is now introduced with its open end foremost into the guide-ring R, and drawn well over the elastic fingers F of the holder H, as shown in Fig. 2, and firmly held thereon by the operator with one hand, while with the other he revolves the pinion-shaft $S^2$ of carriage A in the proper direction, thereby causing the carriage to move downwardly on the standard S and over the roller, carrying the skin or other covering E along with it (see Fig. 3) until it has been completely drawn onto the roller, the downward motion of the carriage A being continued to first properly stretch the covering E and then completely withdraw the fingers F from between the roller $R^2$ and said covering E, as shown in Fig. 4, when the lower open end of said covering is also laced in the usual manner. As the holder H is moved onto the roller its elastic fingers spread to some extent within the skin, so that the latter is readily drawn over the roller as said holder moves along the same.

In reducing a covering of a roller to a less diameter or in tightening a bagged covering, the operation, in so far as the position of the fingers F relatively to said covering is concerned, is reversed, the fingers being applied to the outside thereof and firmly appressed thereto, while the holder is moved down over the roller, the lower end of the covering being first unlaced and again laced after proper reduction or tightening. The same operation takes place in stripping a roller, with the exception that the upper end or both ends of the covering are first unlaced.

In order that the operator may have both hands free to revolve the shaft $S^2$ and correct any irregularities in the covering relatively to the roller, we prefer to employ two or more rubber rings $R^3$ for appressing the covering to the fingers F in clothing a roller or to appress said fingers to the covering in reducing the latter or in tightening a bagged skin or in stripping a roller; and one or more of said rings may be left on the lower end of the roller (see Fig. 4) after being covered and the covering properly stretched until said covering is laced, the roller being preferably first removed from the machine.

Bushings $B'$ of different axial bore to suit rollers having spindles or journals of different diameters, are interchangeably used on the cylinder C for obvious reasons.

From the description of the construction of the machine it will be seen that it is very simple and compact and takes up but very little space, while the result of its operation is far more perfect than that of the hands, the covering being evenly applied and uniformly stretched, leaving a perfectly-smooth surface, and these results, as hereinbefore stated, are obtained by a single operator in an extremely short time as compared with the time necessary to cover a roller by hand.

In order to make the machine still more compact, we pivot the step or table $S'$ to its foot, so that it may be swung inward against the standard S, the table $S'$ being provided with a socket $S^{21}$, that forms a bearing for said standard S.

The machine as described is what may be termed an "upright" machine. It is obvious, however, than when economy in space is no consideration the parts may be arranged in a horizontal position.

Having thus described our invention, what we claim as new therein, and desire to secure by Letters Patent, is—

1. In a machine for covering inking or ink-distributing rolls, a support for the roll and a tubular holder for the skin or covering adapted to encompass the roll and move along the same, for the purpose set forth.

2. In a machine for covering inking or ink-distributing rolls, a support for the roll, a guide for the skin or covering, and a tubular holder for said skin or covering adapted to encompass the roll and move along the same, for the purpose set forth.

3. In a machine for covering inking or ink-distributing rolls, a support for the roll and a holder for the skin or covering, comprising a series of elastic fingers arranged in a circle and adapted to encompass the roll and move along the same, for the purposes set forth.

4. In a machine for covering inking or ink-distributing rolls, a support for the roll, an adjustable guide-ring for the skin or covering, and a holder for the skin or covering, comprising a series of elastic fingers arranged in a circle and adapted to encompass the roll and move along the same, for the purpose set forth.

5. In a machine for covering inking or ink-distributing rolls, a support for the roll, a bearing for the roll spindle or journal detachably connected with said support, and a tubular holder for the skin or covering adapted to encompass the roll and move along the same, for the purpose set forth.

6. In a machine for covering inking or ink-distributing rolls, a support for the roll, a bearing for the roll spindle or journal detachably connected with said support, an adjustable guide-ring for the skin or covering, and a holder for said skin or covering adapted to encompass the roll and move along the same, for the purpose set forth.

7. A machine for covering inking or ink-distributing rolls, comprising a standard, a toothed rack extending along the same, a support for the roll parallel with the rack, a carriage, a pinion mounted thereon and gearing with the rack, a tubular holder for the skin or covering secured to said carriage and adapted to encompass or inclose the roll, and means for revolving the pinion, for the purpose set forth.

8. A machine for covering inking or ink-distributing rolls, comprising a standard, a toothed rack extending along the same, a support for the roll parallel with the rack, a carriage, a pinion mounted thereon and gearing with the rack, a tubular holder for the skin or covering detachably secured to the carriage and adapted to encompass or inclose the roll, and means for revolving the pinion, for the purpose set forth.

9. A machine for covering inking or ink-distributing rolls, comprising a standard, a toothed rack extending along the same, a guide-ring for the skin or covering adjustable on the standard, said ring having a single tooth in gear with the rack and being so connected with the standard that by tilting the ring upwardly said tooth will be disengaged from said rack, a support for the roll to be covered parallel with the toothed rack, a carriage provided with a pinion in gear with said rack, and a tubular holder comprising a series of elastic fingers connected with the carriage and adapted to encompass or inclose the roll, for the purpose set forth.

10. The holder H, composed of a sleeve or thimble having a mutilated flange $h'$ and a series of elastic fingers secured to said thimble, in combination with the carriage A, having curved arms $a'$, provided with an inwardly-projecting grooved rib $a^2$, for the purpose set forth.

JOHN TURNER CARTWRIGHT.
ROUGHSEDGE WALLWORK.

Witnesses:
PETER J. LIVSEY,
WM. FAULKNER.